United States Patent [19]
Heilig

[11] Patent Number: 5,857,697
[45] Date of Patent: Jan. 12, 1999

[54] VEHICLE STEERING WHEEL WITH AN INTEGRATED VEHICLE OCCUPANT RESTRAINT SYSTEM

[75] Inventor: Alexander Heilig, Uhlandstrasse, Germany

[73] Assignee: TRW Occupant Restraint Systems GmbH, Alfdorf, Germany

[21] Appl. No.: 761,306

[22] Filed: Dec. 6, 1996

[30] Foreign Application Priority Data

Dec. 12, 1995 [DE] Germany ........................ 295 19 700 U

[51] Int. Cl.⁶ .................................................... B60R 21/16
[52] U.S. Cl. ........................................ 280/731; 282/728.2
[58] Field of Search ................................ 280/731, 728.2, 280/728.1

[56] References Cited

U.S. PATENT DOCUMENTS

| | | | |
|---|---|---|---|
| 5,480,184 | 1/1996 | Young | 280/731 |
| 5,560,648 | 10/1996 | Rhak et al. | 280/731 |
| 5,584,501 | 12/1996 | Walters | 280/728.2 |
| 5,615,910 | 4/1997 | Margetak et al. | 280/731 |
| 5,626,358 | 5/1997 | Ricks et al. | 280/731 |

FOREIGN PATENT DOCUMENTS

| | | |
|---|---|---|
| 582355 | 2/1994 | European Pat. Off. ............... 280/731 |
| 130840 | 2/1925 | Japan . |
| 5766045 | 4/1982 | Japan . |
| 2133973 | 11/1990 | Japan . |
| 07196000 | 8/1995 | Japan . |
| 09071208 | 3/1997 | Japan . |

Primary Examiner—Christopher P. Ellis
Attorney, Agent, or Firm—Tarolli, Sundheim, Covell, Tummino & Szabo

[57] ABSTRACT

A vehicle steering wheel has an integrated vehicle occupant restraining system comprised of a gas generator with a bracing section and a gas bag with a inlet opening, an edge portion of the inlet opening constituting a holding section. The vehicle steering wheel comprises a hub and a steering wheel body with a gas bag cover which is an integral part of the steering wheel body. A bracing surface is formed on the hub and a holding surface is formed on the steering wheel body. The holding section of the gas bag and the bracing section of the gas generator are clamped between the holding surface of the steering wheel body and the bracing surface of the hub by bracing the hub against a steering wheel body.

12 Claims, 3 Drawing Sheets

VEHICLE STEERING WHEEL WITH AN INTEGRATED VEHICLE OCCUPANT RESTRAINT SYSTEM

BACKGROUND OF INVENTION

The present invention relates to a vehicle steering wheel with an integrated vehicle occupant restraint system. p An inflatable restraint system generally comprises a gas generator and a gas bag with an inlet opening. The function of such a restraint system resides in limiting forward displacement of the driver in relation to the vehicle following an accident. For this purpose the gas bag is converted, in a situation in which it is needed, from a folded inactive state into a deployed active state by gas under pressure, which is furnished by a gas generator.

Conventionally the gas bag is inserted into the vehicle's steering wheel from the side facing the driver. This involves firstly mounting the steering wheel on the associated steering shaft; then the gas bag and possibly the gas generator are inserted into the steering wheel and secured therein. Finally a gas bag cover is placed on top, which protects the gas bag and only frees same on activation of the vehicle occupant restraining system.

SUMMARY OF INVENTION

One object of the invention is to provide a vehicle steering wheel in which the assembly of the vehicle occupant restraint system is substantially simplified.

This is achieved by a vehicle steering wheel which comprises a hub and a steering wheel body with a gas bag cover which is an integral part of the steering wheel body. The steering wheel has an integrated vehicle occupant restraint system which comprises a gas generator with a bracing section and a gas bag with an inlet opening. The inlet opening has an edge portion constituting a holding section. A bracing surface is formed on the hub and a holding surface is formed on the steering wheel body. The holding section of the gas bag and the bracing section of the gas generator are clamped between the holding surface of the steering wheel body and the bracing surface of the hub by bracing the hub against the steering wheel body. Due to this design it is possible to insert the gas bag and the gas generator from the rear into the steering wheel body and then to join the same to the hub with the result that then the components of the vehicle occupant restraint system are fixed in place in the vehicle's steering wheel. It is not necessary afterwards to separately apply the cover of the gas bag later, since same is already an integral part of the steering wheel body.

The invention will now be described with reference to two embodiments, which are shown in the drawings.

DETAILED DESCRIPTION

Figure 1:
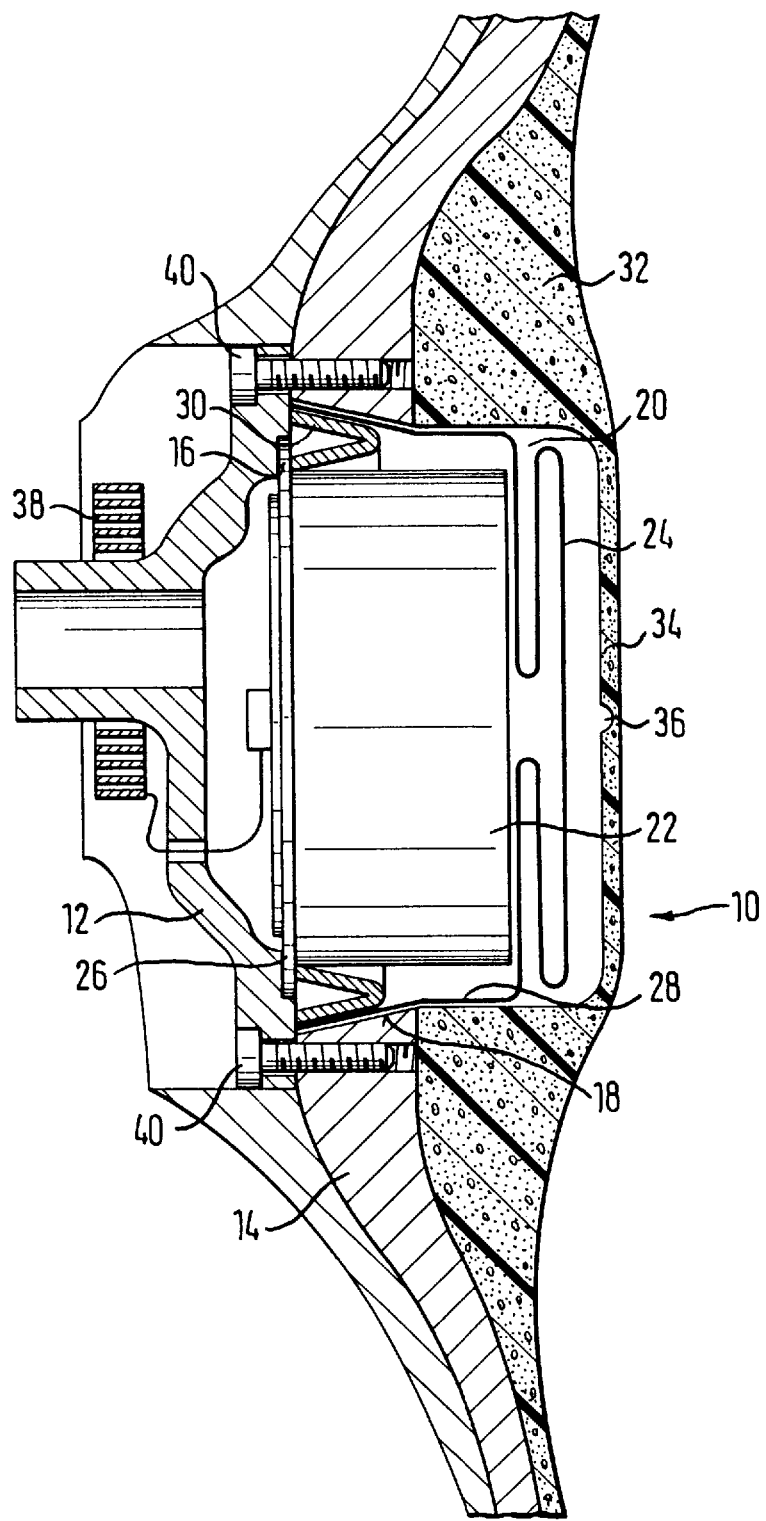
FIG. 1 is a cross section taken through a steering wheel in accordance with a first embodiment of the invention.

In FIG. 1 a vehicle steering wheel 10 according to a first embodiment of the invention is depicted. The vehicle steering wheel 10 includes a hub 12 and a steering wheel body 14. The hub 12 has an annular bracing surface 16, and the steering wheel body 14 has a holding surface 18, which is frustro-conical with a major base facing the bracing surface 16 and a center axis which coincides with the center axis of such bracing surface.

A cavity 20 is formed in the steering wheel body 14 in which a gas generator 22 and a gas bag 24 are arranged. The gas generator 22 is provided with a flange-like bracing section 26, whose dimensions are adapted to the dimensions of the bracing surface 16. The gas bag 24 has an inlet opening, whose edge portion forms a holding section 28 for the gas bag 24. This holding section 28 is frustro-conical with dimensions that are adapted to the dimensions of the holding surface 18. Between the holding section 28 and the bracing section 26 a bracing ring 30 is also arranged, which has a V-like cross section.

The steering wheel body 14 lastly has a casing 32 foamed onto it, whose portion terminating the cavity 20 on the side facing the driver constitutes a gas bag cover 34. On this gas bag cover 34 a tear line 36 is formed, along which the gas bag cover 34 will tear open when the vehicle occupant restraint system is activated.

The assembly of the vehicle steering wheel is performed in the following fashion: the suitably folded up gas bag 24 is so inserted into the cavity 20 of the steering wheel body 14 that the holding section 28 of the latter rests on the holding surface 18. Then the bracing ring 30 is so inserted into the cavity 20 that the opened side of the bracing ring 30 is directed toward the side which is turned away from the gas bag cover 34 and the external peripheral surface of the radially outer limb assumes a position on the holding section 28 of the gas bag 24. Then the gas generator 22 is so placed in the cavity 20 that the one side of the bracing section rests against the end surface of the radially inner limb of the bracing ring 30. Lastly the hub 12 is so mounted on the steering wheel body 14 that the bracing surface 16 rests against the bracing section 26 of the gas generator 22. Now the hub 12 is screwed onto the steering wheel body 14 using screws 40. The dimensions of the bracing surface 16, of the holding surface 18 and of the bracing ring 30 are so selected in this respect that on screwing the hub 12 to the steering wheel body 14 an elastic deformation of the bracing ring 30 occurs with the result that manufacturing tolerances may be allowed for in a particularly simple fashion and furthermore the gas generator 22 and the gas bag 24 may be simply braced against one another and furthermore reliably against the hub 12 and the steering wheel body 14.

This design involves the following advantages: assembly of the vehicle occupant restraint system in the vehicle steering wheel is particularly simple, since apart from the simple insertion of the individual components and screwing the hub to the steering wheel body, no further handling operations are required. More particularly a separate gas bag cover is not now required, since owing to the assembly of the vehicle occupant restraint system starting from the side facing away from the driver of the vehicle steering wheel, the gas bag cover may already be produced as an integral component of the steering wheel body. Owing to the clamping action of the bracing ring allowance for manufacturing inaccuracies is particularly simple. Simultaneously owing to the particular configuration of the holding surface a very high clamping force is obtained. Simultaneously assembly of all components is only performed in one direction, something which offers particular advantages as regards automated assembly. For reliability as regards the fixation of the components of the vehicle occupant restraining system it is furthermore an advantage that all parts necessary for such fixing in position, i. e. the bracing section, the bracing ring and the holding section, are arranged one after the other in the transmission path of the bracing force. If for the connection of the vehicle steering wheel with the steering shaft (not illustrated) a connection is employed which is able to be produced from that side of the vehicle steering wheel which faces away from the driver, it is possible for the vehicle steering wheel to be supplied to the vehicle maker as a pre-assembled group of parts. Such subassembly can already comprise a helical spring 38, by way of which for example signals may be transmitted for the firing of the gas generator to the vehicle steering wheel.

Figure 2:
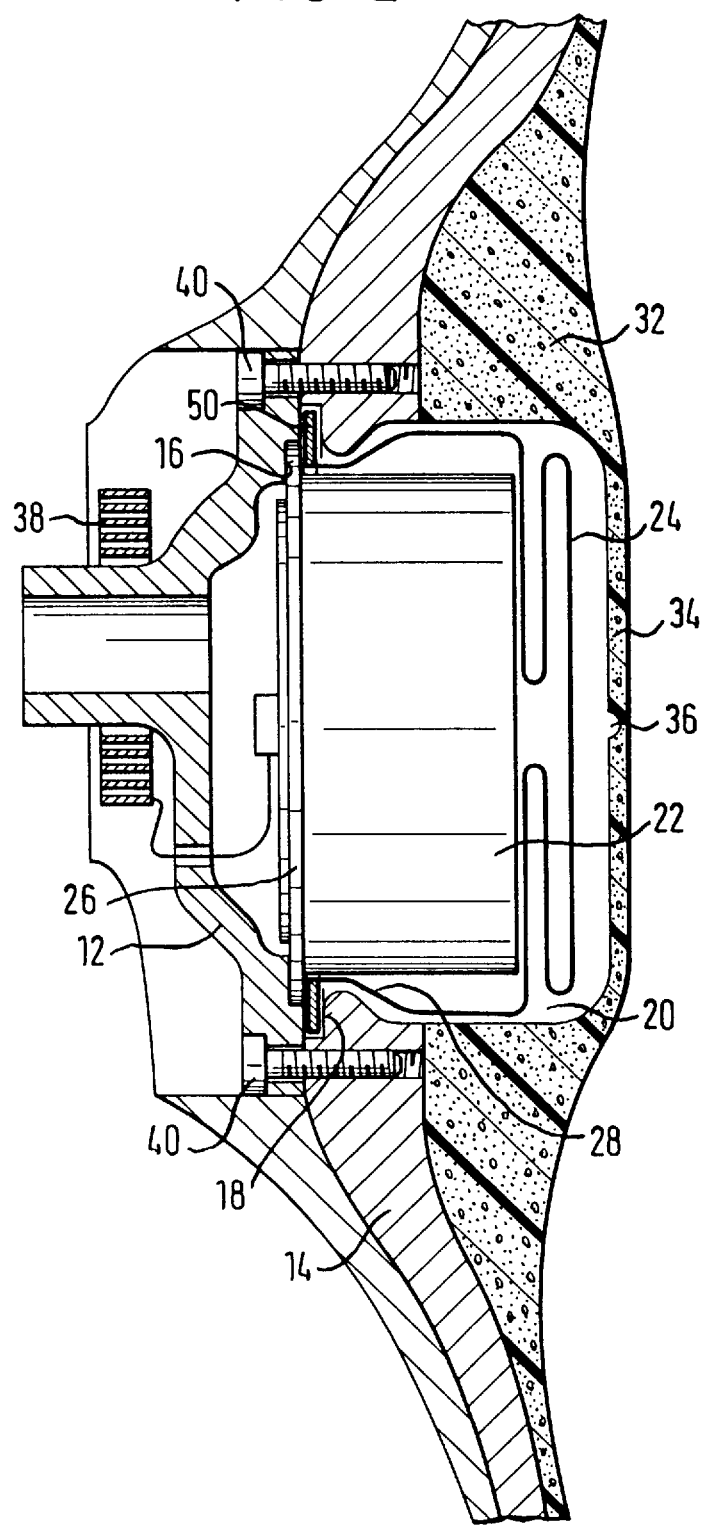
FIG. 2 shows a cross section taken through a steering wheel in accordance with a second embodiment of the invention.
Figure 3:
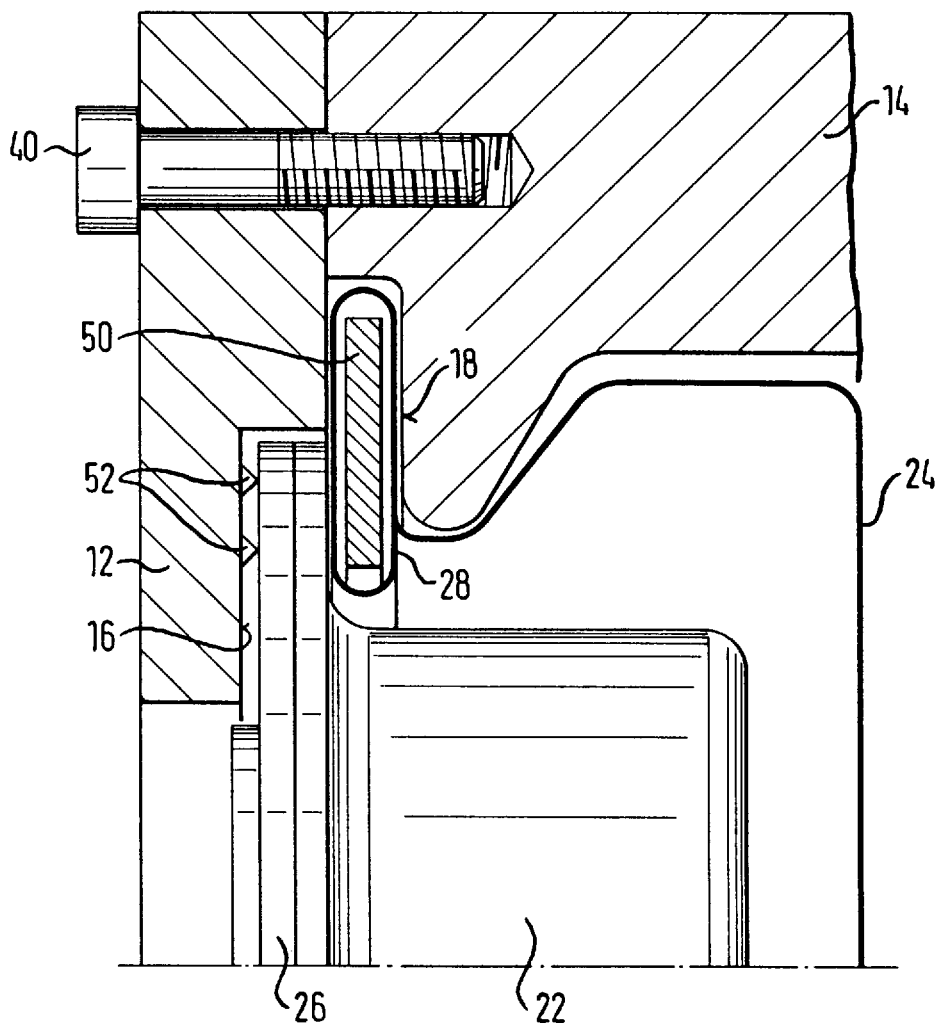
FIG. 3 shows part of the structure of FIG. 2 on a larger scale.

In FIGS. 2 and 3 a vehicle steering wheel according to a second embodiment of the invention is illustrated. In these figures the components already described in connection with FIG. 1 bear the same reference numerals, and as regards the function of such components attention should be given to the specification relating to FIG. 1. In what follows only the differences between the two embodiments shown will be explained.

Unlike the frustro-conical shape of the holding surface in the case of the first embodiment, the holding surface 18 in the second embodiment has the form of a circular ring, whose center axis coincides with the center axis of the bracing surface 16. The holding section 28 of the gas bag 24 comprises a sewn-in holding ring 50, whose cross section is generally rectangular. Furthermore the bracing surface 16 on the hub 12 is provided with a plurality of projecting deformable elements 52 (see FIG. 3).

The assembly of the vehicle occupant restraining system in the vehicle steering wheel is performed in the following fashion: firstly the gas bag 24 is so placed in the cavity 20 that the holding ring 50 lies on the holding surface 18. Then the gas generator 22 is inserted into the cavity 20 so that the bracing section 26 rests on the holding ring 50. Finally the hub 12 is so placed on the steering wheel body 24 that the deformable elements 52 of the bracing surface 16 rest against the bracing section 26 of the gas generator 22. Lastly the hub 12 is screwed to the steering wheel body 14. In this respect the holding ring 50 and the bracing section 26 are clamped between the holding surface 18 and the bracing surface 16, there then being a deformation of the deformable elements 52. This deformation of the deformable elements 52 ensures that, irrespective of any inaccuracies in manufacture, there is a reliable fixation in position of the holding ring 50 and of the bracing section 26. The advantages obtainable by this type of assembly are generally the same as the advantages explained in connection with the first embodiment.

I claim:

1. A vehicle steering wheel comprising a hub and a steering wheel body with a gas bag cover which is an integral part of the steering wheel body, and an integrated vehicle occupant restraint system which comprises a gas generator with a bracing section and a gas bag with an inlet opening, said inlet opening having an edge portion constituting a holding section, wherein a bracing surface is formed on the hub and a holding surface is formed on the steering wheel body, and the holding section of the gas bag and the bracing section of the gas generator are clamped between the holding surface of the steering wheel body and the bracing surface of the hub by bracing the hub against the steering wheel body.

2. The vehicle steering wheel as claimed in claim 1, wherein the bracing surface of the hub forms a circular ring.

3. The vehicle steering wheel as claimed in claim 2, wherein the bracing section of the gas generator is formed as a flange.

4. The vehicle steering wheel as claimed in claim 3, wherein the holding surface of the steering wheel body is frustro-conical with a major base facing the bracing surface of the hub and with a center axis that coincides with a center axis of the circular ring.

5. The vehicle steering wheel as claimed in claim 4, wherein a bracing ring is arranged between the bracing section of the gas generator and the holding section of the gas bag.

6. The vehicle steering wheel as claimed in claim 5, wherein the bracing ring has a V-like cross section which is open toward the bracing surface of the hub, with a radially outer limb that has an outer peripheral surface bearing, by way of the holding section of the gas bag, against the holding surface of the steering wheel body.

7. The vehicle steering wheel as claimed in claim 6, wherein said V-shaped bracing ring has a radially inner limb bearing, by way of the bracing section of the gas generator, against the bracing surface of the hub.

8. The vehicle steering wheel as claimed in claim 6, wherein the bracing ring is elastically deformable.

9. The vehicle steering wheel as claimed in claim 3, wherein the holding surface of the gas bag forms a circular ring with a center axis that coincides with a center axis of the bracing surface.

10. The vehicle steering wheel as claimed in claim 9, wherein a holding ring is sewn into the holding section of the gas bag.

11. The vehicle steering wheel as claimed in claim 10, wherein projecting deformable elements are arranged on the bracing surface of the hub.

12. The vehicle steering wheel as claimed in claim 1, wherein the hub and the steering wheel body are braced together by means of screws.

* * * * *